United States Patent
Hein et al.

(10) Patent No.: US 9,602,464 B2
(45) Date of Patent: Mar. 21, 2017

(54) APPARATUS, SYSTEM AND METHOD FOR ALLOCATING IDENTIFIERS TO COMPONENTS OF A CONTROL SYSTEM

(71) Applicants: Werner Hein, Neubiberg (DE); Martin Polak, Enns (AT); David Loesch, Rohr im Kremstal (AT)

(72) Inventors: Werner Hein, Neubiberg (DE); Martin Polak, Enns (AT); David Loesch, Rohr im Kremstal (AT)

(73) Assignee: Intel Corporation, Sant Clara, CA (US)

( * ) Notice: Subject to any disclaimer, the term of this patent is extended or adjusted under 35 U.S.C. 154(b) by 24 days.

(21) Appl. No.: 14/569,521

(22) Filed: Dec. 12, 2014

(65) Prior Publication Data

US 2016/0173443 A1    Jun. 16, 2016

(51) Int. Cl.
*H04L 29/12*     (2006.01)
*H04L 12/403*    (2006.01)
(Continued)

(52) U.S. Cl.
CPC .......... *H04L 61/2061* (2013.01); *G06F 13/42* (2013.01); *H04L 12/403* (2013.01);
(Continued)

(58) Field of Classification Search
CPC ... G06F 13/42; G06F 13/404; H04L 29/12254
See application file for complete search history.

(56) References Cited

U.S. PATENT DOCUMENTS 8,761,698 B2    6/2014   Langer
8,825,908 B2 *  9/2014   Hueber ............... H04L 61/2038
                                                          710/3
(Continued)

FOREIGN PATENT DOCUMENTS

JP   H08241264    9/1996
JP   2005004478   1/2005
(Continued)

OTHER PUBLICATIONS

Ross, et al., "MIPI's RFFE: A Standard for Unifying Mobile Device Communications Designs", Microwave Journal; http://www.microwavejournal.com/articles/22782-mipis-rffe-a-standard-for-unifying-mobile-device-communications-designs; (Aug. 14, 2014), 5 pgs., Last accessed on Feb. 24, 2015.
(Continued)

*Primary Examiner* — Omer S Mian
(74) *Attorney, Agent, or Firm* — Blakely, Sokoloff, Taylor & Zafman LLP (57) ABSTRACT

Techniques and mechanisms to enable addressing of components accessed via a control interface. In an embodiment, a plurality of identifiers is logically split into first and second pools. The first pool is available for assigning to allow addressing of components while such components are active with respect to some functionality. The second pool is available for assigning to allow addressing of components while such components are passive with respect to some functionality. In another embodiment, different respective identifiers of the first pool pool are assigned each of first one or more of the plurality of components, and a respective identifier of the second pool is assigned to each of second one or more of the plurality of components. Any two of the second one or more components that have the same address
(Continued)

default are assigned different respective identifiers of the second pool.

24 Claims, 6 Drawing Sheets

(51) Int. Cl.
*G06F 13/42* (2006.01)
*H04W 8/26* (2009.01)

(52) U.S. Cl.
CPC ...... *H04L 61/2038* (2013.01); *H04L 61/2046* (2013.01); *H04W 8/26* (2013.01)

(56) References Cited

U.S. PATENT DOCUMENTS

| | | | | |
|---|---|---|---|---|
| 2006/0195522 | A1* | 8/2006 | Miyazaki | A63F 13/06 709/204 |
| 2011/0307632 | A1* | 12/2011 | Hueber | H04L 61/2038 710/3 |
| 2012/0110218 | A1 | 5/2012 | Josefsson et al. | |
| 2012/0303836 | A1* | 11/2012 | Ngo | G06F 13/4247 710/10 |
| 2013/0072253 | A1* | 3/2013 | Siomkos | H04B 1/006 455/550.1 |
| 2013/0262710 | A1* | 10/2013 | Luo | H01Q 1/243 710/9 |
| 2014/0325103 | A1* | 10/2014 | Leitner | G06F 13/4291 710/110 |
| 2015/0056941 | A1* | 2/2015 | Lin | H04B 1/18 455/352 |
| 2015/0106541 | A1* | 4/2015 | Southcombe | G06F 13/4282 710/110 |

FOREIGN PATENT DOCUMENTS

| | | |
|---|---|---|
| JP | 2006133996 | 5/2006 |
| JP | 2012178122 | 9/2012 |
| TW | 561347 | 11/2003 |
| TW | I315035 | 9/2009 |
| TW | 201101044 | 1/2011 |
| TW | 201329731 | 7/2013 |
| WO | WO-2014020716 | 2/2014 |

OTHER PUBLICATIONS

Wilkerson, et al., A look at the MIPI RFFE standard, Mar. 30, 2011; eetasia.com/EE Times-Asia; http://www.eetasia.com/STATIC/PDF/201103/EEOL_2011MAR30_RFD_INT_TA_01.pdf?SOURCES=DOWNLOAD; (Mar. 30, 2011), 3 pgs., Last accessed on Feb. 24, 2015.
European Search Report for Application No. 15193961.8, mailed Apr. 11, 2016, 7 pages.
Notice of Allowance and Search Report for Taiwanese Application No. 104134522, dated Oct. 17, 2016, 4 pages.
Notice of Allowance for Japanese Patent Application No. 2015-214065 mailed Sep. 27, 2016, 2 pgs., no English translation.

* cited by examiner

APPARATUS, SYSTEM AND METHOD FOR ALLOCATING IDENTIFIERS TO COMPONENTS OF A CONTROL SYSTEM

BACKGROUND

1. Technical Field

The invention relates generally to circuit control mechanisms and more particularly, but not exclusively, to techniques for assigning identifiers to components accessed via a control interface.

2. Background Art

Various radio frequency front-end (RFFE) interface standards and system power management interface (SPMI) standards released by the MIPI® Alliance are some examples of mechanisms that provide for unique slave identifiers (USIDs) to variously address different respective components of a platform. Typically, such components are coupled to a configuration and/or control ("configuration/control" herein) bus, where host logic, also coupled to the configuration/control bus, functions as a master to control the components.

During a power up or reset of a conventional platform, such slave components are each associated with a default identifier that is defined by the component's vendor, manufacturer or the like. USIDs are then variously assigned to facilitate addressing of the components, where such addressing does not use the components' default identifiers. One reason for this is to account for the possibility that two components from the same manufacturer (or vendor, etc.) have the same default identifier.

In the particular case of MIPI® RFFE standards and MIPI® SPMI standards, USIDs are defined as values of some fixed (limited) size—e.g., four-bit values, where one such four-bit value (such as 0b0000) is reserved as a broadcast identifier. This limits to fifteen (15) the total number of available USID to be used according to various MIPI®-compliant control interfaces. Therefore, for a given use case, a system implementing MIPI®-compliant control mechanisms is limited to no more than fifteen slave components that can be addressed by the same control bus during that use case.

A system can mitigate the effects of limited USID availability by implementing one or more additional configuration/control buses. However, the use of multiple configuration/control buses increases system complexity and cost, and decreases the efficiency of resource utilization. One additional configuration/control bus can require at least three additional contacts on a bus master device. Furthermore, the bus-master must adopt multiple bus identifiers as an additional addressing element. As the variety and complexity of use cases for mobile devices continue to grow, there is an increasing demand for efficient mechanisms to accommodate such use cases.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms to facilitate the addressing of components of a system each with a respective one of a predetermined, fixed plurality of identifiers. The multiple identifiers—e.g., the USIDs defined by a RFFE standard, a SPMI standard or other standard—may be available for assignment at different times to different ones of multiple components of the system. In an embodiment, a total number of the multiple identifiers available for assignment may be less than a total number of the multiple components.

The multiple identifiers may be variously allocated each to a respective one of a first pool and a second pool. A subsequent assignment of identifiers each to a respective component may include selection of an identifier from only one of the first pool and the second pool. For a given first operational mode of the system, slave components that are to be active during the first operational mode may each be assigned a different respective identifier from the first pool. By contrast, slave components that are to be passive during the first operational mode may each be assigned a respective identifier from the second pool.

The system may be subsequently reconfigured for a second operational mode other than the first operational mode—e.g., to transition from supporting a first communication type to supporting a second communication type. For such reconfiguration, slave components that are to be active during the second operational mode may each be assigned a different respective identifier from the first pool. By contrast, slave components that are to be passive during the second operational mode may each be assigned a respective identifier from the second pool. In an embodiment, the assignment of identifiers to slave components differs between the first operational mode and the second operational mode.

Such pool allocation and/or identifier assignment functionality may be implemented, according to an embodiment, as an extension to conventional component selection and address assignment mechanisms of a control interface standard. For example, a state machine, algorithm or other control logic may be added (or modified) to support the various grouping of identifiers into pools and/or the selection of identifiers from such pools for assignment to components.

Embodiments discussed herein solve various problems that are not posed by most conventional mobile device platforms that operate according to only one wireless technology. Typically, vendors of mobile devices supporting a given wireless technology (e.g., Long-Term Evolution, or "LTE") keep a total number of RFFE slave components well below a limit (e.g., 15) imposed by front-end control/configuration mechanisms used in such devices. However, these various problems are posed when one considers the possibility of having a mobile device that supports multiple communication technologies requiring different respective combinations of active front-end components, where a total number of components addressable via a particular configuration/control bus is greater than a total number of identifiers available for assignment.

In an embodiment, components of a system are each associated with respective default address identifier information (referred to herein as an "address default") that is used to identify the component before assignment of an identifier and/or between different identifier assignments. An address default may include, for example, a manufacturer identifier (mID), a product identifier (pID) or a combination thereof. An address default is to be distinguished from another identifier—referred to herein as a USID—that may be variously assigned, and reassigned, to different components at different times. An address default of a component and a USID currently assigned to the same component may be used in determining a particular next USID to be assigned to that component. Embodiments variously prevent components that have the same address default (e.g., the same mID/pID pair) from being assigned the same alternative address identifier at the same time. This constraint may be imposed even when such components are each to be passive during an operational mode of the system. As a result, a system RESET is not needed to release the components from their respective passive configuration.

Certain embodiments are discussed herein with respect to a MIPI® RFFE specification and an associated maximum number of fifteen USIDs available for assignment to RFFE components. However, such discussion may be extended to additionally or alternatively applying to any of the variety of other control interface specification that defines some maximum number of identifiers available for addressing components.

Figure 1:
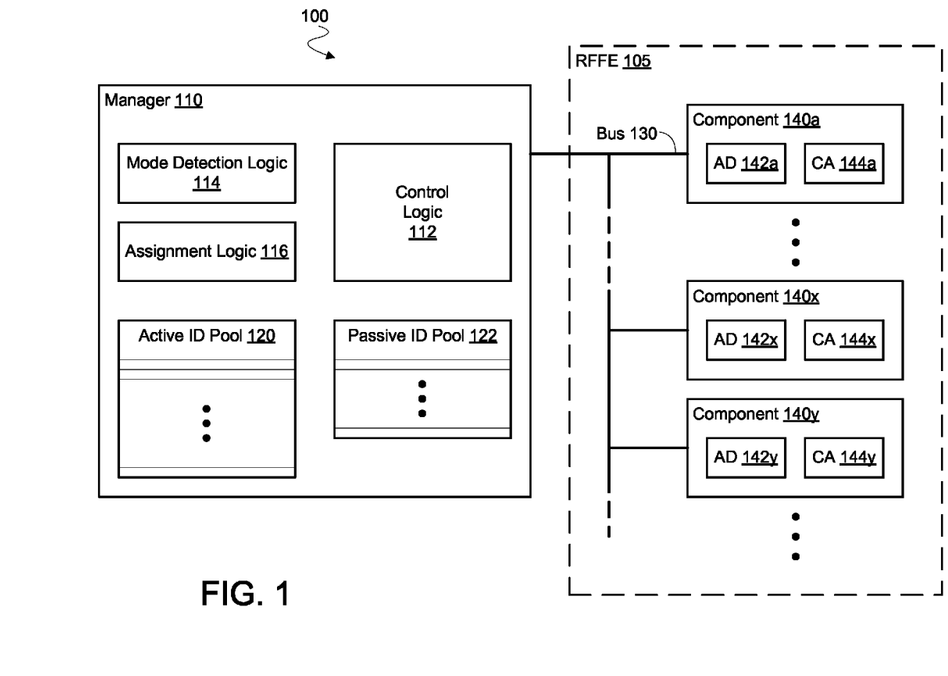
FIG. 1 is a high-level functional block diagram illustrating elements of system including components to be accessed via a control interface according to an embodiment.

FIG. 1 shows one example of a system 100 according to an embodiment for variously providing addressing schemes each for a different mode of a RFFE (or other system). System 100 may provide RFFE configuration and control mechanisms for any of a variety of wireless-capable platforms including, but not limited to, that of a handheld device (e.g., smart phone, tablet, notebook, etc.), a laptop computer and/or the like. The RFFE of such a platform may enable communication of the platform with any of a variety of cellular and/or other wireless networks.

In an embodiment, system 100 includes a manager 110 coupled via a bus 130 to a plurality of components of a RFFE 105. In another embodiment, manager 110 is part of RFFE 105. Manager 110 includes logic (e.g., hardware, firmware and/or executing software) to facilitate configuration and/or reconfiguration of any of various modes of RFFE 105, where such configuration/reconfiguration includes assigning USIDs each to a respective one of the plurality of RFFE components. For brevity, "component" is also used herein to refer to such a RFFE component (unless otherwise indicated).

A component of RFFE 105 may correspond to a respective initial identifier (iID) that serves as an address default for that component. The iID may be defined as an address identifier of the component during power up and/or reset of system 100. A component's manufacturer may define the iID of the component. USID (re)programming procedures—e.g., as variously defined in MIPI® Alliance RFFE specifications—allow a bus master such as manager 110 to assign to a bus slave component a USID as an alternative to the component's iID. The USID replaces the iID and is valid until the device is reset or a USID reprogramming procedure is initiated. During a given mode, components of RFFE 105 may each be addressed by the respective USID that manager 110 has assigned to that component for that mode. Transitioning RFFE 105 from one mode to another mode may include manager 110 reassigning a given USID from one component to some other component.

Some or all such modes may each support a different respective communication type. By way of illustration and not limitation, one or more modes may variously support third generation (3G) communications conforming to a International Mobile Telecommunications-2000 (IMT-2000) specification of the International Telecommunication Union. Alternatively or in addition, one or more modes may variously support fourth generation (4G) communications that, for example, conform to a Worldwide Interoperability for Microwave Access (WiMAX) implementation of one of the IEEE 802.16 series of wireless broadband standards written by the Institute of Electrical and Electronics Engineers (IEEE). Such 4G communications may additionally or alternatively include communications conforming to a 4G Long-Term Evolution (LTE) standard—e.g., specified in the Release 8 or the Release 9 of the 3rd Generation Partnership Project (3GPP).

Manager 110 may be constrained to a limited total number x (where x is some integer greater than 1) of USIDs available for selection to be assigned for configuration of a given mode. By way of illustration and not limitation, RFFE control and configuration functionality of manger 110 may conform to a MIPI® Alliance RFFE standard that limits the number of USIDs to fifteen—e.g., where the MIPI® RFFE limits USIDs to only four-bit values and, in some embodiments, reserves one such four-bit value for broadcast addressing. In an embodiment, manager 110 conforms to the MIPI® Alliance Specification for Radio Frequency Front-End Control Interface (RFFE) v1.00.00, August 2010, the MIPI® Alliance Specification for Radio Frequency Front-End Control Interface (RFFE) v1.10, December 2011, or other such standard.

Manager 110 may provide functionality to allow addressability of a total number of components of RFFE 105 via bus 130 that is greater than the total number x of available USIDs. For example, the plurality of components to be addressable with USIDs via bus 130 may include x components 140a, . . . , 140x, as well as one or more additional components (as represented by the illustrative component 140y). Components 140a, . . . , 140x, 140y, etc. may each be associated with a respective address default (AD)—e.g., as represented by the respective address defaults 142a, . . . , 142x, 142y.

Components 140a, . . . , 140x, 140y may variously include hardware each to implement functionality of a respective wireless communication type. By way of illustration and not limitation, components 140a, . . . , 140x, 140y may each include a respective one of frequency division duplex (FDD) circuitry, time division duplex (TDD) circuitry, one or more power amplifiers and/or the like. The particular functionality provided by such component may depend upon the specific communication types supported by RFFE 105. These communication types and their corresponding components and functionality may be variously based on conventional wireless communication techniques, which are not limiting on certain embodiments and are not detailed herein.

In a alternate embodiment, system 100 is a power management system, wherein components 140a, . . . , 140x, 140y etc. are instead any of a variety of components—e.g., other than RFFE components—for which manager 110 is to provide power management. Such power management may conform to any of a variety of standards including, for example, the MIPI® Alliance specification for System Power Management Interface (SPMI) v.1.00.00, approved December 2008 and the MIPI® Alliance specification for SPMI v.2, approved September 2012. Such components may include, for example, any of a variety of processors, modems, hubs, memory devices or other packaged devices (or components thereof) configured to operate as slaves for control and/or configuration by a manager based on addressing mechanisms discussed herein.

Manager 110 may include mode detection logic 114 comprising circuitry configured to identify one or more modes of RFFE 105. In one embodiment, mode detection logic 114 selects a mode to be configured from among a plurality of available modes—e.g., based on mode information that is included in or otherwise accessible to manager 110. Such mode information may identify, for each of the plurality of modes, one or more components of RFFE 105 that are to be active during that mode and/or one or more components of RFFE 105 that can be passive during that mode. Manager 110 may be preprogrammed with such mode information or, alternatively may generate such mode information—e.g., in response to a power up, a system reset, a RFFE mode configuration request or the like.

For example, mode detection logic 114 may identify a plurality of modes each to be available for configuration at various times. In an embodiment, mode detection logic 114 identifies all of the plurality of components that are available to be assigned some USID for addressing via bus 130. These components may be distinguished, for example, from any component of RFFE 105 that is not to be addressed with any USID in any mode—e.g., at least not by manager 110 via bus 130. Identification of the plurality of modes may further comprise mode detection logic 114 identifying, for each of the plurality of modes, which of the plurality of components are active components of that mode and which of the plurality of components are passive components of that mode. A component may be classified as active with respect to a given mode based on a need during that mode for the component to be available for implementing some functionality—e.g., in support of wireless communication according to the given mode. By contrast, such a component may be classified as passive with respect to another mode where such functionality is not needed during that other mode. For example, although certain embodiments are not limited in this regard, configuration of a given RFFE mode may include selectively disabling at least some functionality of a component that supports a communication type other than any associated with that configured RFFE mode.

Mode detection logic 114 may receive some signal—e.g., from a manufacturer, a local wireless network or a consumer/user—indicating that a particular mode of the RFFE is to be configured. Such a signal may be provided as an a priori input, the source of which is not limiting on certain embodiments. In response to detecting that a particular mode is to be configured, mode detection logic 114 may communicate information to assignment logic 116 of manager 110, the information indicating how USIDs are to be assigned. For example, mode detection logic may identify to assignment logic 116 those ones of components 140a, . . . , 140x, 140y that are to be assigned USIDs from an active ID pool 120. Alternatively or in addition, mode detection logic 114 may identify to assignment logic 116 those ones of components 140a, . . . , 140x, 140y that are to be assigned a respective USID from a passive ID pool 122.

Active ID pool 120 may include one or more registers or other such circuitry configured to identify those USIDs that are each available to be assigned for addressing of some component only during a mode for which that component is active. By contrast, passive ID pool 122 includes circuitry configured to identify those USIDs that are each available to be assigned for addressing of some component only during a mode for which that component is passive. In one embodiment, manager 110 is preprogrammed with active ID pool 120 and passive ID pool 122. In another embodiment, manager 110 includes circuitry to generate active ID pool 120 and/or passive ID pool 122—e.g., in response to a power up, a system reset, a RFFE mode configuration request or the like.

A plurality of components of RFFE 105 may each include a respective configured address (CA) repository to store or otherwise represent the USID assigned to that component for the currently configured mode. For example, the respective CA 144a, . . . , CA 144x, CA 144y of components 140a, . . . , 140x, 140y may each store a respective USID assigned by assignment logic 116 for a particular mode. The USIDs variously stored at CA 144a, . . . , CA 144x, CA 144y may allow for addressing of components 140a, . . . , 140x, 140y—e.g., by control logic 112 of manager 110. Such addressing may be for manager 110 to provide for system control/configuration operations that, for example, are adapted from conventional MIPI® RFFE (or other control interface) techniques.

Figure 2:
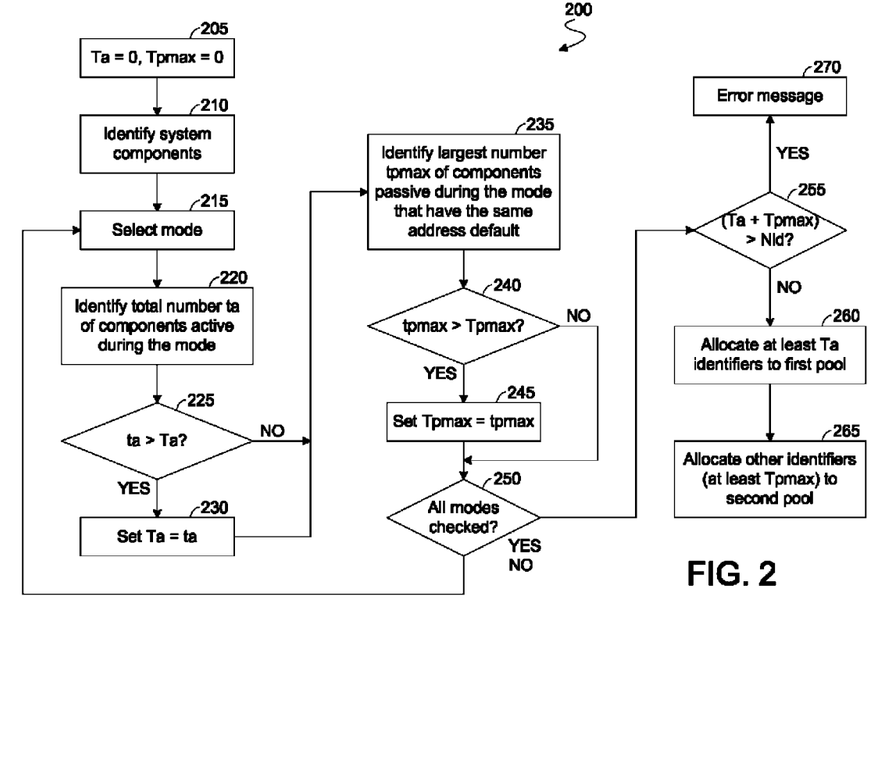
FIG. 2 is a flow diagram illustrating elements of a method for allocating identifiers each to a respective one of multiple pools according to an embodiment.

FIG. 2 illustrates elements of a method 200 for determining pools of USIDs that, for example, are to be made available for USID assignment operations for configuring a system (e.g., a RFFE or a power management system). Method 200 may be performed with circuitry included in or coupled to manager 110, for example, to generate active ID pool 120 and/or passive ID pool 122.

Method 200 is one example of operations that identify a minimum required number of active USIDs and variously allocates a limited available set of USIDs each to a respective one of an active ID pool and the passive ID pool, where such allocation is based on the identified minimum. By way of illustration and not limitation, method 200 may include, at 205, setting to some baseline value—e.g., zero (0)—a variable Ta representing a largest total number of active components for a mode. In some embodiments, the operations at 205 may further comprise setting to some baseline value—e.g., zero (0)—a variable Tpmax representing, for a mode, a largest number of passive components for that mode that have the same address default.

Method 200 may include, at 210, identifying the system components that are available to be variously assigned USIDs. For example, the identifying at 210 may include identifying each of components 140a, . . . , 140x, 140y etc. coupled to bus 130. After such components have been identified, method 200 may evaluate the configuration of such components for each of the plurality of modes. For example, method 200 may select one such mode for evaluation at 215. For the mode selected at 215, method 200 may identify, at 220, a total number ta of components that are to be active during that mode.

A comparison is then performed, at 225, to determine whether the number ta most recently identified at 220 is greater than the current value of the variable Ta. The variable Ta may be updated at 230 to be equal to the most recently identified number ta, if Ta was determine at 225 to be less than that number ta. Otherwise, such updating at 230 may be skipped, and method 200 may proceed to identifying, at 235, a largest number tpmax of components that are both to be passive during the mode and that have the same address default. In one illustrative scenario, five components may be passive during a given mode, wherein two of the five components each have a first address default, and wherein the other three components each have a different, second address default. In such an instance, the identifying at 235 would determine for that given mode a value of three (3) for tpmax.

A comparison is then performed, at 240, to determine whether the number tpmax most recently identified at 235 is greater than the current value of the variable Tpmax. The variable Tpmax may be updated at 245 to be equal to the most recently identified number tpmax, if Tpmax was determine at 240 to be less than that number tpmax. Otherwise, such updating at 245 may be skipped, and method 200 may proceed to determining, at 250, whether all modes have been evaluated.

Method 200 may return to the selecting at 215 if one or more modes remain to be evaluated. Otherwise, method 200 may determine, at 255, whether a sum of current values of Ta and Tpmax is greater than a total number Nid of USIDs that are available to be assigned. In one embodiment, Nid is equal to 15 (e.g., as defined by various MIPI® Alliance RFFE specifications or MIPI® Alliance SPMI specifications). Where is the sum is greater than Nid, method 200 may generate an error message at 270—e.g., to invoke some remedial action and/or to prevent a requested (re)configuration of the RFFE. However, where the sum is determined at 255 to be less than (or equal to) Nid, method 200 may, at 260, allocate to a first pool—e.g., active ID pool 120—at least Ta of the Nid available USIDs. Moreover, method 200 may, at 265, allocate to a second pool—e.g., passive ID pool 122—at least Tpmax of the Nid available USIDs.

In another embodiment, method 200 avoids evaluation of tpmax values and instead relies upon a manufacturer to assure that Nid is large enough to accommodate the sum of Ta and Tpmax for all possible modes. In such an embodiment, method 200 may exclude the operations at 235, 240 and 245—e.g., wherein the determining at 250 immediately follows from either of operations 225, 230. Furthermore, method 200 may omit operations 255, 270—e.g., wherein the allocating at 260 and/or 265 follows immediately after the determining at 250.

Figure 3:
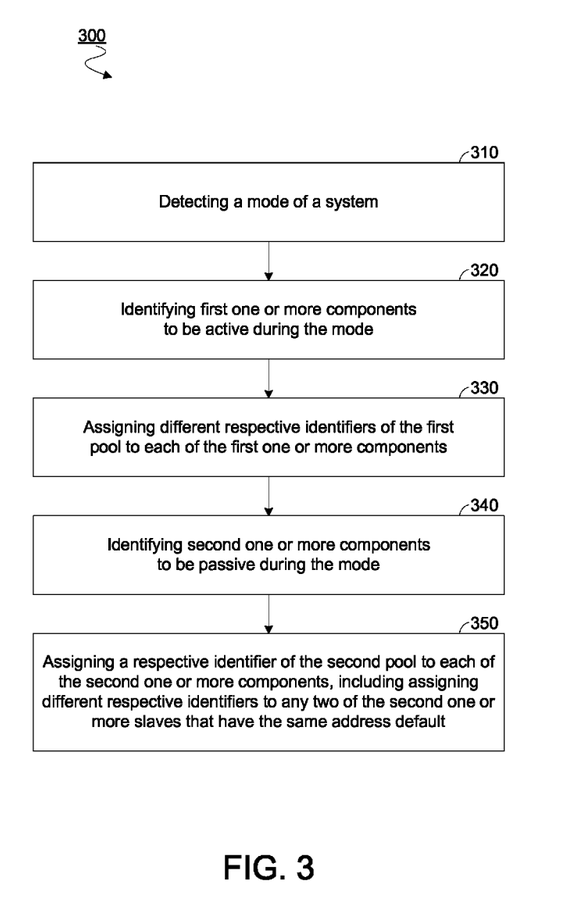
FIG. 3 is a flow diagram illustrating elements of a method for assigning identifiers to components to be accessed via a control interface according to an embodiment.

FIG. 3 illustrates elements of a method 300 to facilitate configuration of a system (e.g., a RFFE or a power management system) according to an embodiment. Method 300 may be performed, for example, with logic of manager 110. In an embodiment, method 300 variously assigns USIDs to components based on an allocation of such USIDs each to a respective one of a first pool and a second pool. Such pools may be determined, for example, according to method 200.

Figure 4:
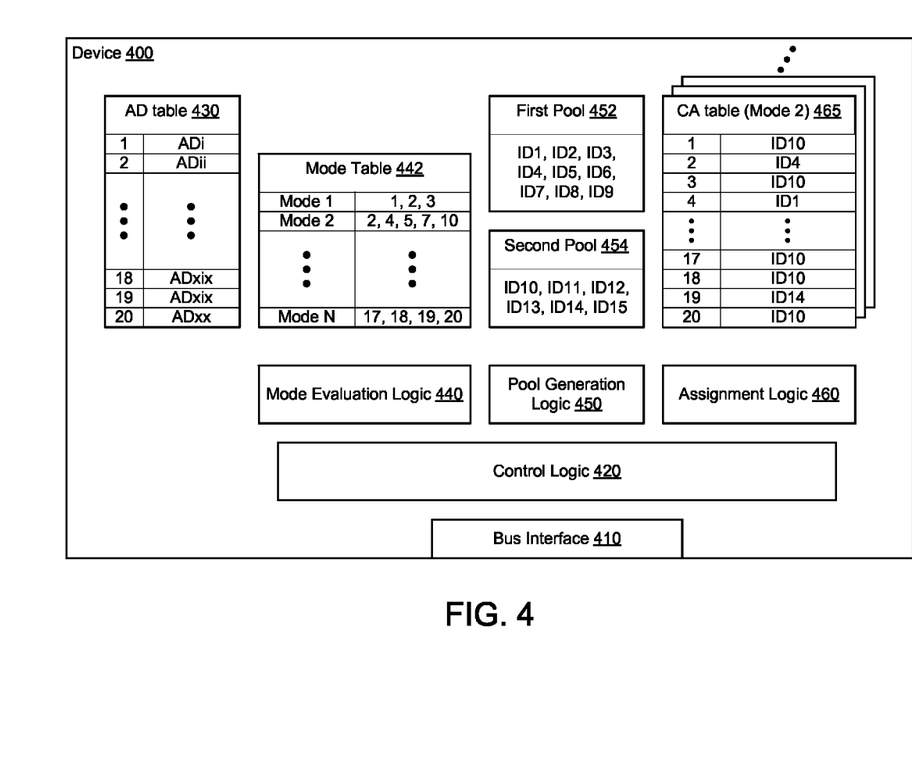
FIG. 4 is a high-level functional block diagram illustrating elements of a device to configure components via a control interface according to an embodiment.

To illustrate certain features of various embodiments, method 300 is discussed herein with respect to operation of a device 400 shown in FIG. 4. Device 400 may have some or all of the features of manager 110, for example. In an embodiment, device 400 includes a bus interface 410 to couple device 400 to multiple slave components of an RFFE (or power managed components of a hardware platform) via a control/configuration bus such as bus 130. Control logic 420 of device 400 may manage or otherwise support operation of such components, where such support includes communications with the components that conform to a MIPI® Alliance RFFE standard, a MIPI® Alliance SPMI standard, or the like. This communication may rely upon addressing of components that is assigned according to method 300.

Device 400 may include or otherwise have access to one or more data structures—e.g., as represented by the illustrative address default (AD) table 430—identifying, for each of multiple components, a respective iID or other address default for that component. In one scenario AD table 430 may store respective address default values ADi, ADii, . . . , ADxix, ADxix, ADxx for components 1 through 20. However, the particular number of components and the particular address defaults of such components is merely illustrative. It is notable that, in the illustrative scenario of FIG. 4, two components (18 and 19) have the same address default ADxix.

Device 400 may further include or otherwise have access to information that specifies or otherwise indicates, for each of a plurality of system modes, which components are to be active during that mode and/or which components are to be passive during that mode. By way of illustration and not limitation, a mode table 442 of device 400 may list for each of N modes—where N is an integer larger than 1—those components that are to be active (or alternatively, passive) during that mode. The absence of a component from the list for a given mode may be understood to mean that the component in question is to be passive (or alternatively, active) during that mode. The particular modes represented by mode table 442 are merely illustrative and not limiting on certain embodiments.

Device 400 may further comprise a first pool 452 including USIDs that are each available to be allocated for addressing of a component only during a mode in which that component is to be active. A second pool 452 of device 400 may include USIDs that are each available to be allocated for addressing of a component only during a mode in which that component is to be passive. The total number of USIDs in first pool 452 and second pool 454 may be less than a total number of components listed in AD table 430. The particular number of available USIDs, and their various allocations to first pool 452 and second pool 454, is merely illustrative and not limiting on certain embodiments.

Device 400 may be preprogrammed with one or more of AD table 430, mode table 442, first pool 452 and second pool 454. In some embodiments, first pool 452 and/or second pool 454 may be generated by logic of device 400—such as the illustrative pool generation logic 450. Such generation of first pool 452 and second pool 454 may be according to method 200, for example.

Referring now to FIG. 3, method 300 may include, at 310, detecting a mode of the system. For example, mode evaluation logic 440 may receive an input signal indicating that USIDs are to be assigned to components coupled to device 400 via bus interface 410, where such assignment is to facilitate addressing of the components during the mode that is to be configured. In response to the detecting at 310, method 300 may, at 320, identify first one or more components that are to be active during the mode that is to be configured. By way of illustration and not a limitation, mode evaluation logic 440 may detect at 310 that the Mode 2 (represented in mode table 442) is to be configured. Based on mode table 442, mode evaluation logic 440 may identify, at 320, that the listed components 2, 4, 5, 7 and 10 are to be active during Mode 2.

Method 300 may include, at 330, assigning different respective identifiers of the first pool to each of the first one or more components identified at 320. For example, mode evaluation logic 440 may communicate to assignment logic 460 of device 400 information specifying or otherwise indicating those components that, as indicated by mode table 442, are to be active during the mode. In response, circuitry of assignment logic 460 may select for assignment to each such component a different respective USID of first pool 452. In the illustrative scenario discussed above, components 2, 4, 5, 7 and 10 may each be active for Mode 2, and as a result may, for example, be assigned (respectively) active USIDs ID4, ID1, ID5, ID6 and ID9.

Method 300 may further comprise, at 340, identifying a second one or more components that are to be passive during the mode that is to be configured. For example, mode evaluation logic 440 may determine based on mode table 442 that the components represented in AD table 430 other than components 2, 4, 5, 7 and 10 are to be passive during Mode 2.

Method 300 may include, at 350, assigning a respective identifier of the second pool to each of the second one or more components identified at 340. For example, mode evaluation logic 440 may communicate to assignment logic 460 information specifying or otherwise indicating those components that are to be passive during the mode. In response, assignment logic 460 may select for assignment to each such component a respective USID of second pool 454. In the illustrative scenario, the same USID of second pool 454—e.g., ID10—may be assigned to multiple passive components at the same time. However, assignment logic 460 may prevent any concurrent assignment of the same USID of second pool 454 to passive components that have the same address default. For example, in the illustrative scenario, components 18 and 19 have the same address default value ADxix. Accordingly, components 18 and 19 may be assigned different USIDs (e.g., ID10 and ID 14, respectively) from second pool 454. This may prevent addressing conflicts that might otherwise require a system reset to make components 18 and 19 once again distinguishable from one another in signaling via the configuration/control bus. In an embodiment, operations of method 300 shown in FIG. 3 may be repeated one or more times—e.g., where each such repetition is to implement a corresponding address scheme that facilitates a respective system mode of a plurality of such modes.

Although certain embodiments are not limited in this regard, device 400 may generate, for each of one or more modes, a data structure including information describing the assignment of USIDs to components in order to implement that mode. Such a data structure may be generated prior to a given request to configure a particular mode, where the data structure will be available in advance as reference information if/when the request is subsequently provided. By way of illustration and not limitation, device 400 may include or otherwise have access to one or more configured address (CA) tables including, for example, the illustrative CA table 465 corresponding to Mode 2. The CA table 465 may be indexed by identifiers of the components represented in AD table 430, for example, and may associate each such component with a corresponding USID to be assigned to that component if/when Mode 2 is to be configured.

Figure 5:
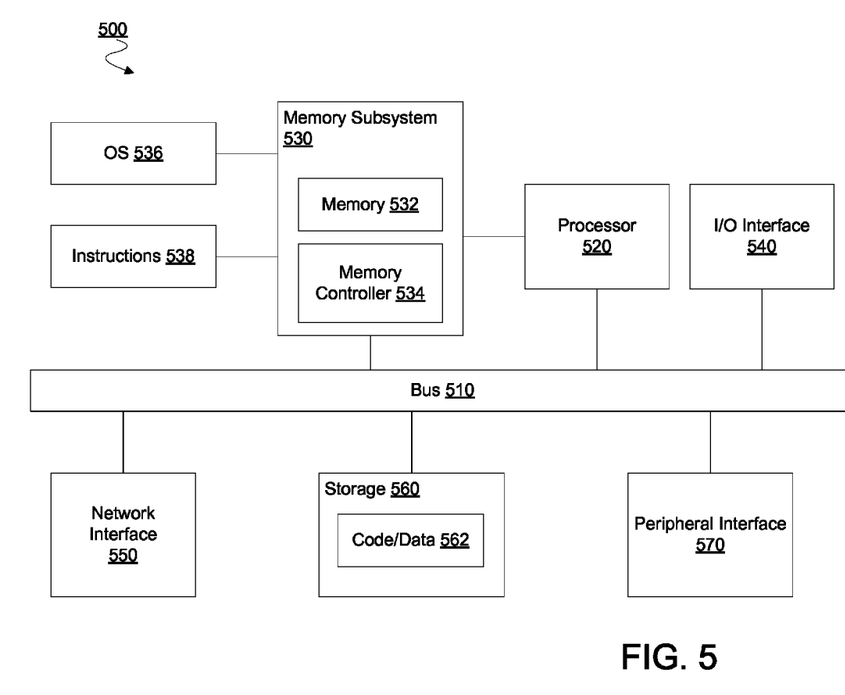
FIG. 5 is a block diagram illustrating elements of a computing system for configuring components via a control interface according to an embodiment.

FIG. 5 is a block diagram of an embodiment of a computing system in which control system addressing mechanisms may be implemented. System 500 represents a computing device in accordance with any embodiment described herein, and may be a laptop computer, a desktop computer, a server, a gaming or entertainment control system, a scanner, copier, printer, or other electronic device. System 500 may include processor 520, which provides processing, operation management, and execution of instructions for system 500. Processor 520 may include any type of microprocessor, central processing unit (CPU), processing core, or other processing hardware to provide processing for system 500. Processor 520 controls the overall operation of system 500, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 may include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520.

Memory subsystem 530 may include memory device 532 where it stores data, instructions, programs, or other items. In one embodiment, memory subsystem includes memory controller 534 to access memory 532—e.g., on behalf of processor 520.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 may also correspond to interfaces in network interface 550.

System 500 may also include one or more input/output (I/O) interface(s) 540, network interface 550, one or more internal mass storage device(s) 560, and peripheral interface 570 coupled to bus 510. I/O interface 540 may include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 may include an Ethernet adapter, wireless interconnection components, USB (universal serial bus), or other wired or wireless standards-based or proprietary interfaces. In an embodiment, network interface 550 includes a RFFE that is configured by manager logic included in or coupled to the RFFE—e.g., where such configuration includes or is facilitated by address assignment as discussed herein.

Storage 560 may be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 may be generically considered to be a "memory," although memory 530 is the executing or operating memory to provide instructions to processor 520. Whereas storage 560 is nonvolatile, memory 530 may include volatile memory (i.e., the value or state of the data is indeterminate if power is interrupted to system 500).

Peripheral interface 570 may include any hardware interface not specifically mentioned above. Peripherals refer generally to devices that connect dependently to system 500.

A dependent connection is one where system 500 provides the software and/or hardware platform on which operation executes, and with which a user interacts.

Figure 6:
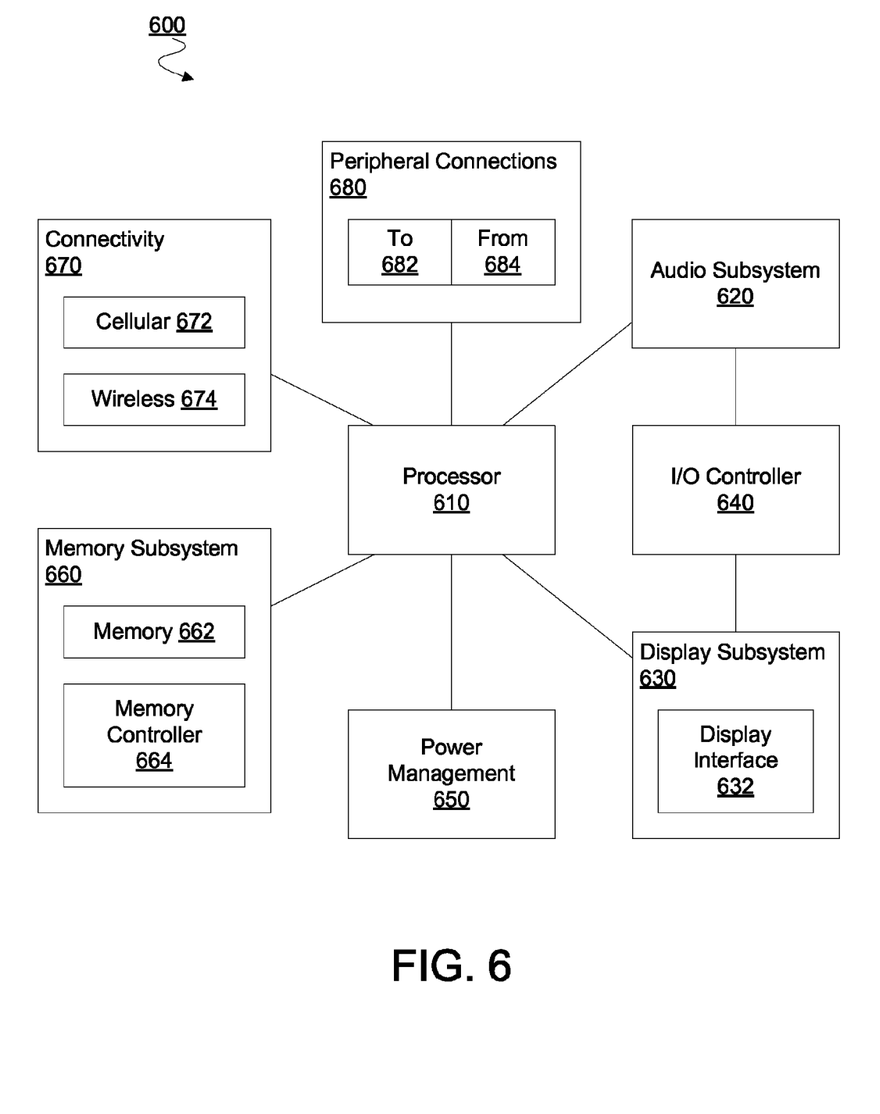
FIG. 6 is a block diagram illustrating elements of a mobile device for configuring components via a control interface according to an embodiment.

FIG. 6 is a block diagram of an embodiment of a mobile device in which control system addressing mechanisms may be implemented. Device 600 represents a mobile computing device, such as a computing tablet, a mobile phone or smartphone, a wireless-enabled e-reader, or other mobile device. It will be understood that certain of the components are shown generally, and not all components of such a device are shown in device 600.

Device 600 may include processor 610, which performs the primary processing operations of device 600. Processor 610 may include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 may include display interface 632, which may include the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 may operate to manage hardware that is part of audio subsystem 620 and/or display subsystem 630. Additionally, I/O controller 640 illustrates a connection point for additional devices that connect to device 600 through which a user might interact with the system. For example, devices that may be attached to device 600 might include microphone devices, speaker or stereo systems, video systems or other display device, keyboard or keypad devices, or other I/O devices for use with specific applications such as card readers or other devices.

As mentioned above, I/O controller 640 may interact with audio subsystem 620 and/or display subsystem 630. For example, input through a microphone or other audio device may provide input or commands for one or more applications or functions of device 600. Additionally, audio output may be provided instead of or in addition to display output. In another example, if display subsystem includes a touchscreen, the display device also acts as an input device, which may be at least partially managed by I/O controller 640.

There may also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that may be included in device 600. The input may be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 may include memory device(s) 662 for storing information in device 600. Memory subsystem 660 may include nonvolatile (state does not change if power to the memory device is interrupted) and/or volatile (state is indeterminate if power to the memory device is interrupted) memory devices. Memory 660 may store application data, user data, music, photos, documents, or other data, as well as system data (whether long-term or temporary) related to the execution of the applications and functions of system 600.

In one embodiment, memory subsystem 660 includes memory controller 664 (which could also be considered part of the control of system 600, and could potentially be considered part of processor 610). Memory controller 664 may communicate signaling to access memory 662—e.g., on behalf of processor 610.

Connectivity 670 may include hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 may include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector may allow device 600 to connect to certain peripherals that allow device 600 to control content output, for example, to audiovisual or other systems.

In addition to a proprietary docking connector or other proprietary connection hardware, device 600 may make peripheral connections 680 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a device comprises mode evaluation logic including circuitry configured to detect a first mode of a system and, in response, to identify first one or more components of the system that are to be active during the first mode, and second one or more components of the system that are to be passive during the first mode. The device further comprises assignment logic including circuitry configured to assign different respective identifiers of an active component identifier pool to each of the first one or more components, the assignment logic further to assign a respective identifier of a passive component identifier pool to each of the second one or more components, including the assignment logic to assign different respective identifiers to any two of the second one or more components that have the same address default.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front-End Interface specification or a MIPI System Power Management Interface specification. In another embodiment, an address default of one of the plurality of components is based on a manufacturer identifier or a vendor identifier.

In another embodiment, the mode evaluation logic is further to identify the plurality of components of the system and to identify a plurality of modes of the system, each of the plurality of modes corresponding to a respective value ta equal to a total number of the plurality of components that are to be active during that mode. The device further comprises pool generation logic to determine a value Ta equal to the largest value of the values ta each corresponding to a respective one of the plurality of modes, wherein based on the value Ta, the pool generation logic is to allocate first one or more of a fixed plurality of identifiers to the active component identifier pool, and the pool generation logic is to allocate second one or more of the fixed plurality of identifiers to the passive component identifier pool.

In another embodiment, each of the plurality of modes further corresponds to a respective value tpmax equal to a total number of the plurality of components that correspond to a same address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of identifiers to the passive component identifier pool further based on Tpmax. In another embodiment, the device further comprises pool generation logic to generate the active component identifier pool and the passive component identifier pool in response to a signal requesting configuration of the first mode. In another embodiment, the mode evaluation logic to detect the first mode includes the mode evaluation logic to detect, after a generation of the active component identifier pool and the passive component identifier pool, a signal requesting configuration of the first mode.

In another implementation, a method comprises detecting a first mode of a system including a plurality of components each corresponding to a respective address default, identifying first one or more components of the system that are to be active during the first mode, assigning different respective identifiers of an active component identifier pool to each of the first one or more components, identifying second one or more components of the system that are to be passive during the first mode, and assigning a respective identifier of a passive component identifier pool to each of the second one or more components, including assigning different respective identifiers to any two of the second one or more components that have the same address default.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front-End Interface specification or a MIPI System Power Management Interface specification. In another embodiment, an address default of one of the plurality of components is based on a manufacturer identifier or a vendor identifier.

In another embodiment, the method further comprises identifying the plurality of components of the system, identifying a plurality of modes of the system, each of the plurality of modes corresponding to a respective value ta equal to a total number of the plurality of components that are to be active during that mode, determining a value Ta equal to the largest value of the values ta each corresponding to a respective one of the plurality of modes, and based on the value Ta, allocating first one or more of a fixed plurality of identifiers to the active component identifier pool, and allocating second one or more of the fixed plurality of identifiers to the passive component identifier pool.

In another embodiment, each of the plurality of modes further corresponds to a respective value tpmax equal to a total number of the plurality of components that correspond to a same address default and are to be passive during that mode. The method further comprises determining a value Tpmax equal to the largest value of the values tpmax each corresponding to a respective one of the plurality of modes, wherein allocating the second one or more of the fixed plurality of identifiers to the passive component identifier pool is further based on Tpmax. In another embodiment, the method further comprises generating the active component identifier pool and the passive component identifier pool in response to a signal requesting configuration of the first mode. In another embodiment, detecting the first mode includes detecting, after a generation of the active component identifier pool and the passive component identifier pool, a signal requesting configuration of the first mode.

In another implementation, a non-transitory computer-readable storage medium having stored thereon instructions which, when executed by one or more processing units, cause the one or more processing units to perform a method comprising detecting a first mode of a system including a plurality of components each corresponding to a respective address default, identifying first one or more components of the system that are to be active during the first mode, assigning different respective identifiers of an active component identifier pool to each of the first one or more components, identifying second one or more components of the system that are to be passive during the first mode, and assigning different respective identifiers of a passive component identifier pool to each of the second one or more components, including assigning different respective identifiers to any two of the second one or more components that have the same address default.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front-End Interface specification or a MIPI System Power Management Interface specification. In another embodiment, an address default of one of the plurality of components is based on a manufacturer identifier or a vendor identifier.

In another embodiment, the method further comprises identifying the plurality of components of the system, identifying a plurality of modes of the system, each of the plurality of modes corresponding to a respective value ta equal to a total number of the plurality of components that are to be active during that mode, determining a value Ta equal to the largest value of the values ta each corresponding to a respective one of the plurality of modes, based on the value Ta, allocating first one or more of a fixed plurality of identifiers to the active component identifier pool, and allocating second one or more of the fixed plurality of identifiers to the passive component identifier pool.

In another embodiment, each of the plurality of modes further corresponds to a respective value tpmax equal to a total number of the plurality of components that correspond to a same address default and are to be passive during that mode, the method further comprises determining a value Tpmax equal to the largest value of the values tpmax each corresponding to a respective one of the plurality of modes, wherein allocating the second one or more of the fixed plurality of identifiers to the passive component identifier pool is further based on Tpmax. In another embodiment, the method further comprises generating the active component identifier pool and the passive component identifier pool in response to a signal requesting configuration of the first mode. In another embodiment, detecting the first mode includes detecting, after a generation of the active component identifier pool and the passive component identifier pool, a signal requesting configuration of the first mode.

In another implementation, a system includes a plurality of components each corresponding to a respective address default, a bus, and a manager device coupled to the plurality of components via the bus. The manager device includes mode evaluation logic including circuitry configured to detect a first mode of the system and, in response, to identify first one or more components of the plurality of components that are to be active during the first mode, and second one or more components of the plurality of components that are to be passive during the first mode. The manager device further includes assignment logic including circuitry configured to assign different respective identifiers of an active component identifier pool to each of the first one or more components, the assignment logic further to assign a respective identifier of a passive component identifier pool to each of the second one or more components, including the assignment logic to assign different respective identifiers to any two of the second one or more components that have the same address default.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front-End Interface specification or a MIPI System Power Management Interface specification. In another embodiment, an address default of one of the plurality of components is based on a manufacturer identifier or a vendor identifier.

In another embodiment, the mode evaluation logic is further to identify the plurality of components and to identify a plurality of modes of the system, each of the plurality of modes corresponding to a respective value ta equal to a total number of the plurality of components that are to be active during that mode, the manager device further comprises pool generation logic to determine a value Ta equal to the largest value of the values ta each corresponding to a respective one of the plurality of modes, wherein based on the value Ta, the pool generation logic is to allocate first one or more of a fixed plurality of identifiers to the active component identifier pool, and the pool generation logic is to allocate second one or more of the fixed plurality of identifiers to the passive component identifier pool.

In another embodiment, each of the plurality of modes further corresponds to a respective value tpmax equal to a total number of the plurality of components that correspond to a same address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of identifiers to the passive component identifier pool further based on Tpmax. In another embodiment, the system further comprises pool generation logic to generate the active component identifier pool and the passive component identifier pool in response to a signal requesting configuration of the first mode. In another embodiment, the mode evaluation logic to detect the first mode includes the mode evaluation logic to detect, after a generation of the active component identifier pool and the passive component identifier pool, a signal requesting configuration of the first mode.

In another implementation, a device comprises mode evaluation logic including circuitry configured to identify a plurality of components of a system, the plurality of components each corresponding to a respective address default, the mode evaluation logic further configured to identify a plurality of modes of the system, each of the plurality of modes corresponding to a respective value ta equal to a total number of the plurality of components that are to be active during that mode. The device further comprises pool generation logic including circuitry configured to receive from the mode evaluation logic information indicating a value Ta equal to the largest value of the values ta each corresponding to a respective one of the plurality of modes, the pool generation logic further to allocate first one or more of a fixed plurality of identifiers to an active component identifier pool, and to allocate second one or more of the fixed plurality of identifiers to a passive component identifier pool.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front End Interface specification or a MIPI System Power Management Interface specification. In another embodiment, an address default of one of the plurality of components is based on a manufacturer identifier or a vendor identifier. In another embodiment, each of the plurality of modes further corresponds to a respective value tpmax equal to a total number of the plurality of components that correspond to a same address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of identifiers to the passive component identifier pool further based on Tpmax.

In another implementation, a method comprises identifying a plurality of components of a system, the plurality of components each corresponding to a respective address default, identifying a plurality of modes of the system, each of the plurality of modes corresponding to a respective value ta equal to a total number of the plurality of components that are to be active during that mode, determining a value Ta equal to the largest value of the values ta each corresponding to a respective one of the plurality of modes, and based on the value Ta, allocating first one or more of a fixed plurality of identifiers to an active component identifier pool, and allocating second one or more of the fixed plurality of identifiers to a passive component identifier pool.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front End Interface specification or a MIPI System Power Management Interface specification. In another embodiment, an address default of one of the plurality of components is based on a manufacturer identifier or a vendor identifier.

In another embodiment, each of the plurality of modes further corresponds to a respective value tpmax equal to a total number of the plurality of components that correspond to a same address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of identifiers to the passive component identifier pool further based on Tpmax.

In another implementation, a non-transitory computer-readable storage medium has stored thereon instructions which, when executed by one or more processing units, cause the one or more processing units to perform a method comprising identifying a plurality of components of a system, the plurality of components each corresponding to a respective address default, and identifying a plurality of modes of the system, each of the plurality of modes corresponding to a respective value ta equal to a total number of the plurality of components that are to be active during that mode. The method further comprises determining a value Ta equal to the largest value of the values ta each corresponding to a respective one of the plurality of modes, and based on the value Ta, allocating first one or more of a fixed plurality of identifiers to an active component identifier pool, and allocating second one or more of the fixed plurality of identifiers to a passive component identifier pool.

In an embodiment, a total number of identifiers of the active component identifier pool and the passive component identifier pool is less than a total number of the plurality of components. In another embodiment, the total number of identifiers of the active component identifier pool and the passive component identifier pool conforms to a limit defined by a MIPI Radio Frequency Front End Interface specification or a MIPI System Power Management Interface specification. In another embodiment, an address default of one of the plurality of components is based on a manufacturer identifier or a vendor identifier. In another embodiment, each of the plurality of modes further corresponds to a respective value tpmax equal to a total number of the plurality of components that correspond to a same address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of identifiers to the passive component identifier pool further based on Tpmax.

Techniques and architectures for configuring components accessed via a control interface are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
    mode evaluation logic including circuitry configured to detect a first mode of a system of a radio frequency front-end and, in response, to identify:
        a first set of one or more slave components coupled to a bus of the system, wherein the one or more slave components of the first set are to be active during the first mode; and
        a second set of one or more components coupled to the bus of the system, wherein the one or more slave components of the second set are to be passive during the first mode;
    assignment logic including circuitry configured to:
        allocate slave identifiers of a third set of unique slave identifiers each to a respective one of an active component identifier pool and a passive component identifier pool, the third set including all slave identifiers available to be selected to configure the first mode;
        assign different respective slave identifiers of the active component identifier pool to each of the one or more slave components of the first set;
        assign a respective slave identifier of the passive component identifier pool to each of the one or more slave components of the second set, including the assignment logic to assign different respective slave identifiers to any two of the one or more slave components of the second set that have identical address defaults.

2. The device of claim 1, wherein a total number of slave identifiers of the active component identifier pool and the passive component identifier pool is less than a total number of the first set of one or more slave components and the second set of one or more slave components.

3. The device of claim 2, wherein the total number of slave identifiers of the active component identifier pool and the passive component identifier pool conforms to a limit defined by a MIPI Radio Frequency Front-End Interface specification or a MIPI System Power Management Interface specification.

4. The device of claim 1, wherein an address default of one of the second set of one or more slave components is based on a manufacturer identifier or a vendor identifier.

5. The device of claim 1, the mode evaluation logic further to identify a plurality of slave components of the system and to identify a plurality of modes of the system, the plurality of slave components including the one or more slave components of the first set and the one or more slave components of the second set, each of the plurality of modes corresponding to a respective value ta equal to a total number of the plurality of slave components that are to be active during that mode, the device further comprising:
    pool generation logic to determine a value Ta equal to the largest value of the values ta each corresponding to a respective one of the plurality of modes, wherein based on the value Ta:
        the pool generation logic to allocate first one or more of a fixed plurality of slave identifiers to the active component identifier pool; and
        the pool generation logic to allocate second one or more of the fixed plurality of slave identifiers to the passive component identifier pool.

6. The device of claim 5, wherein each of the plurality of modes further corresponds to a respective value tpmax equal to a total number of the plurality of slave components that correspond to an identical address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of slave identifiers to the passive component identifier pool further based on Tpmax.

7. The device of claim 1, further comprising:
    pool generation logic to generate the active component identifier pool and the passive component identifier pool in response to a signal requesting configuration of the first mode.

8. The device of claim 1, wherein the mode evaluation logic to detect the first mode includes the mode evaluation logic to detect, after a generation of the active component identifier pool and the passive component identifier pool, a signal requesting configuration of the first mode.

9. A method comprising:
    detecting a first mode of a system of a radio frequency front-end, the system including a plurality of slave components each corresponding to a respective address default;
    allocating slave identifiers of a set of unique slave identifiers each to a respective one of an active component identifier pool and a passive component identifier pool, the set of unique slave identifiers including all slave identifiers available to be selected to configure the first mode;
    identifying a first set of one or more slave components of the system, wherein the one or more slave components of the first set are to be active during the first mode;
    assigning different respective slave identifiers of the active component identifier pool to each of the one or more slave components of the first set;

identifying a second set of one or more slave components of the system, wherein the one or more slave components of the second set are to be passive during the first mode; and assigning a respective slave identifier of the passive component identifier pool to each of the one or more slave components of the second set, including assigning different respective slave identifiers to any two of the ne or more slave components of the second set that have identical address defaults.

10. The method of claim 9, wherein a total number of slave identifiers of the active component identifier pool and the passive component identifier pool is less than a total number of the plurality of slave components.

11. The method of claim 10, wherein the total number of slave identifiers of the active component identifier pool and the passive component identifier pool conforms to a limit defined by a MIPI Radio Frequency Front-End Interface specification or a MIPI System Power Management Interface specification.

12. The method of claim 9, wherein an address default of one of the plurality of slave components is based on a manufacturer identifier or a vendor identifier.

13. The method of claim 9, further comprising:
identifying the plurality of slave components of the system, the plurality of slave components including the one or more slave components of the first set and the one or more slave components of the second set;
identifying a plurality of modes of the system, each of the plurality of modes corresponding to a respective value ta equal to a total number of the plurality of slave components that are to be active during that mode;
determining a value Ta equal to the largest value of the values ta each corresponding to a respective one of the plurality of modes;
based on the value Ta:
allocating first one or more of a fixed plurality of slave identifiers to the active component identifier pool; and
allocating second one or more of the fixed plurality of slave identifiers to the passive component identifier pool.

14. The method of claim 13, wherein each of the plurality of modes further corresponds to a respective value tpmax equal to a total number of the plurality of slave components that correspond to an identical address default and are to be passive during that mode, the method further comprising:
determining a value Tpmax equal to the largest value of the values tpmax each corresponding to a respective one of the plurality of modes;
wherein allocating the second one or more of the fixed plurality of slave identifiers to the passive component identifier pool is further based on Tpmax.

15. A non-transitory computer-readable storage medium having stored thereon instructions which, when executed by one or more processing units, cause the one or more processing units to perform a method comprising:
detecting a first mode of a system of a radio frequency front-end, the system including a plurality of slave components each corresponding to a respective address default;
allocating slave identifiers of a set of unique slave identifiers each to a respective one of an active component identifier pool and a passive component identifier pool, the set of unique slave identifiers including all slave identifiers available to be selected to configure the first mode;

identifying a first set of one or more slave components of the system, wherein the one or more slave components of the first set are to be active during the first mode;
assigning different respective slave identifiers of the active component identifier pool to each of the one or more slave components of the first set;
identifying a second set of one or more slave components of the system, wherein the one or more slave components of the second set are to be passive during the first mode; and
assigning a respective slave identifier of the passive component identifier pool to each of the one or more slave components of the second set, including assigning different respective slave identifiers to any two of the one or more slave components of the second set that have identical address defaults.

16. The computer-readable storage medium of claim 15, wherein a total number of slave identifiers of the active component identifier pool and the passive component identifier pool is less than a total number of the plurality of slave components.

17. The computer-readable storage medium of claim 16, wherein the total number of slave identifiers of the active component identifier pool and the passive component identifier pool conforms to a limit defined by a MIPI Radio Frequency Front-End Interface specification or a MIPI System Power Management Interface specification.

18. The computer-readable storage medium of claim 15, further comprising:
identifying the plurality of slave components of the system, the plurality of slave components including the one or more slave components of the first set and the one or more slave components of the second set;
identifying a plurality of modes of the system, each of the plurality of modes corresponding to a respective value ta equal to a total number of the plurality of slave components that are to be active during that mode;
determining a value Ta equal to the largest value of the values ta each corresponding to a respective one of the plurality of modes;
based on the value Ta:
allocating first one or more of a fixed plurality of slave identifiers to the active component identifier pool; and
allocating second one or more of the fixed plurality of slave identifiers to the passive component identifier pool.

19. The computer-readable storage medium of claim 18, wherein each of the plurality of modes further corresponds to a respective value tpmax equal to a total number of the plurality of slave components that correspond to an identical address default and are to be passive during that mode, the method further comprising:
determining a value Tpmax equal to the largest value of the values tpmax each corresponding to a respective one of the plurality of modes;
wherein allocating the second one or more of the fixed plurality of slave identifiers to the passive component identifier pool is further based on Tpmax.

20. A system including:
a plurality of slave components each corresponding to a respective address default;
a bus; and
a manager device coupled to the plurality of slave components via the bus, the manager device including:

mode evaluation logic including circuitry configured to detect a first mode of the system and, in response, to identify:
  a first set of one or more slave components of the plurality of slave components, wherein the one or more slave components of the first set are to be active during the first mode; and
  a second set of one or more slave components of the plurality of slave components, wherein the one or more slave components of the second set are to be passive during the first mode; and
assignment logic including circuitry configured to:
  allocate slave identifiers of a third set of unique slave identifiers each to a respective one of an active component identifier pool and a passive component identifier pool, the third set including all slave identifiers available to be selected to configure the first mode;
  assign different respective slave identifiers of the active component identifier pool to each of the one or more slave components of the first set;
  assign a respective slave identifier of the passive component identifier pool to each of the one or more slave components of the second set, including the assignment logic to assign different respective slave identifiers to any two of the one or more slave components of the second set that have identical address defaults.

21. The system of claim 20, wherein a total number of slave identifiers of the active component identifier pool and the passive component identifier pool is less than a total number of the plurality of slave components.

22. The system of claim 21, wherein the total number of slave identifiers of the active component identifier pool and the passive component identifier pool conforms to a limit defined by a MIPI Radio Frequency Front-End Interface specification or a MIPI System Power Management Interface specification.

23. The system of claim 20, the mode evaluation logic further to identify the plurality of slave components and to identify a plurality of modes of the system, the plurality of slave components including the one or more slave components of the first set and the one or more slave components of the second set, each of the plurality of modes corresponding to a respective value ta equal to a total number of the plurality of slave components that are to be active during that mode, the manager device further comprising:
  pool generation logic to determine a value Ta equal to the largest value of the values ta each corresponding to a respective one of the plurality of modes, wherein based on the value Ta:
    the pool generation logic to allocate first one or more of a fixed plurality of slave identifiers to the active component identifier pool; and
    the pool generation logic to allocate second one or more of the fixed plurality of slave identifiers to the passive component identifier pool.

24. The system of claim 23, wherein each of the plurality of modes further corresponds to a respective value tpmax equal to a total number of the plurality of slave components that correspond to an identical address default and are to be passive during that mode, the pool generation logic further to determine a value Tpmax equal to the largest value of the values tpmax each corresponding to a respective one of the plurality of modes, wherein the pool generation logic to allocate the second one or more of the fixed plurality of slave identifiers to the passive component identifier pool further based on Tpmax.

* * * * *